(No Model.)
H. E. ROWE.
FEATHER RENOVATOR.
No. 244,148.  Patented July 12, 1881.
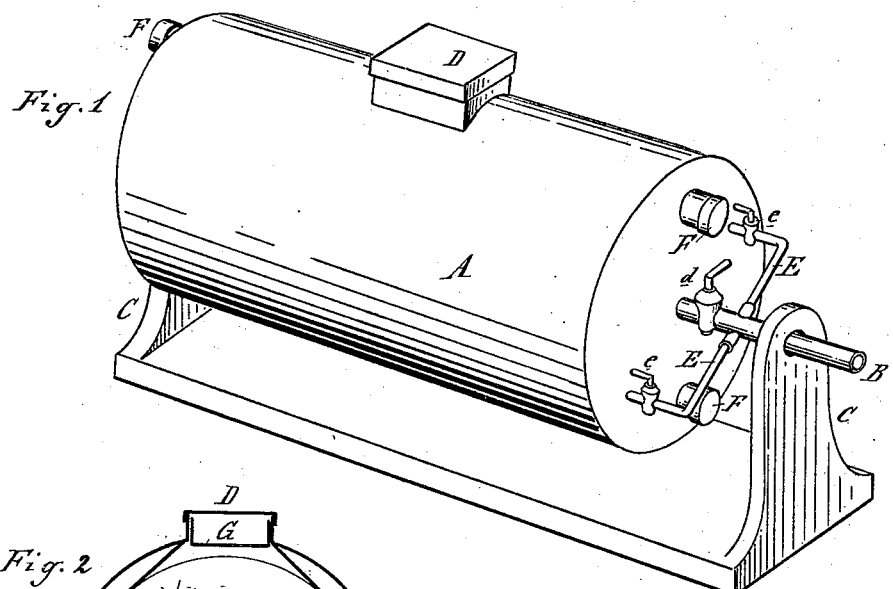
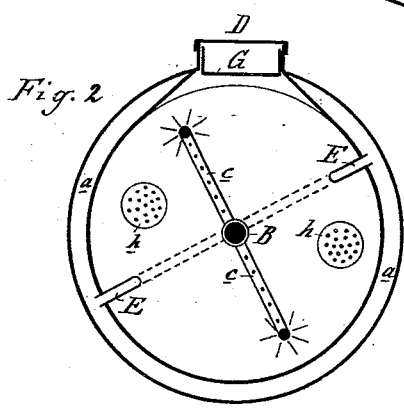
Attest:
A. Barthel
A. J. Sprague
Inventor:
Horace E. Rowe
by Thos. S. Sprague
Atty

UNITED STATES PATENT OFFICE.

HORACE E. ROWE, OF EAST SAGINAW, MICHIGAN, ASSIGNOR OF ONE-HALF TO JAMES H. TOLFREE, LEVI W. SIMPSON, AND CHAS. O. GARRISON, OF SAME PLACE.

FEATHER-RENOVATOR.

SPECIFICATION forming part of Letters Patent No. 244,148, dated July 12, 1881.

Application filed March 23, 1881. (No model.)

*To all whom it may concern:*

Be it known that I, HORACE E. ROWE, of East Saginaw, in the county of Saginaw and State of Michigan, have invented an Improvement in Feather-Renovators, of which the following is a specification.

The nature of this invention relates to certain new and useful improvements in the construction of devices more especially designed for cleaning feathers; and the invention consists in the peculiar construction of a cylinder and the arrangement therewith of certain steam-pipes, all as more fully hereinafter set forth.

Figure 1 is a perspective view. Fig. 2 is a vertical cross-section. Fig. 3 is a longitudinal section.

In the accompanying drawings, which form a part of this specification, A represents a cylinder, mounted upon a hollow shaft, B, which has bearings in standards C of any suitable frame. This cylinder is made with double walls, leaving a space, $a$, between them, and is provided with an opening, $b$, through which access is had to the interior, and through which the feathers are introduced. This opening is provided with a suitable cap, D, by means of which it may be closed when desired. The hollow shaft B within the cylinder is provided with the arms $c$, which are perforated. Outside the cylinder the hollow shaft is provided with the branch steam-pipes E, which pass through the head and extend nearly to the opposite end of the cylinder, and are bent outwardly, projecting through the inner wall of the cylinder, so as to discharge steam into the space $a$. The shaft B is provided with a suitable valve, $d$, and the pipes E are likewise provided with proper valves, $e$.

In each head of the cylinder are secured one or more escape-pipes, F, which are provided with proper caps to close their outer ends, while their inner ends are covered with a perforated plate, $h$.

G is a removable perforated plate, which is inserted in the opening $b$, the several perforated coverings being used to prevent the feathers from being blown out of the cylinder in the process of drying.

The feathers to be renovated are placed within the cylinder, the plate G and cap D are put in place, and the pipes F are closed by their caps. Steam is then admitted through the pipe B from any suitable source of supply, and a rotary motion is given to the cylinder and shaft. The steam thus admitted escapes through the perforated pipes $c$, thoroughly steaming the feathers. After they have been sufficiently steamed the valve $d$ is closed and the valves $e$ are opened, while the caps are removed from the opening $b$ and pipes F. Steam then passes through the pipes E into the space $a$, which thoroughly heats the cylinder and dries the feathers, the vapor thrown off by them escaping through the pipes and opening. After they have become sufficiently dry the steam is shut off and the cylinder is turned with the opening down, the perforated plate G being removed. A proper tick is then placed around the mouth of the opening to receive the feathers.

If desired, a blower may be attached to one end of the hollow shaft to force a current of air through the pipes $c$, which will materially assist in removing the feathers.

A carbolic liquid may be employed for disinfecting, if desired, which may be introduced into the pipe B, so as to commingle with the the steam.

What I claim as my invention is—

1. In a device for renovating feathers, a double-walled cylinder mounted on a hollow shaft, on which it rotates, in combination with close or imperforate pipes communicating with said hollow shaft outside of the cylinder, and passing through one head of said cylinder and extending through the interior of the same to a point near the opposite end, and there communicating with its hollow or double wall, substantially as and for the purpose specified.

2. In a feather-renovator, and in combination with the hollow shaft B and double-walled cylinder A, the perforated pipes $c$, having both ends communicating with the shaft B, and the close pipes E E, connected at one end with the shaft B outside of the cylinder, passing through one end of said cylinder and communicating with the double wall of the same from the interior, substantially as and for the purpose specified.

3. A feather-renovator consisting of the double-walled cylinder A, provided with perforated plates $h$, hollow shaft B, provided with the perforated pipes $c$, and close steam-pipes E, valves $d\ e$, opening $b$ and its cover D, annular space $a$, and pipes F, all constructed, arranged, and operating substantially in the manner and for the purposes herein set forth.

HORACE E. ROWE.

Witnesses:
 H. S. SPRAGUE,
 E. W. ANDREWS.